United States Patent
Huang et al.

(10) Patent No.: US 11,503,204 B2
(45) Date of Patent: Nov. 15, 2022

(54) GRADIENT-BASED EXPOSURE AND GAIN CONTROL TECHNIQUES

(71) Applicant: Magic Leap, Inc., Plantation, FL (US)

(72) Inventors: Shih-Che Huang, Lauderhill, FL (US); Christian Ivan Robert Moore, Cupertino, CA (US); Brian Keith Smith, Wellington, FL (US)

(73) Assignee: Magic Leap, Inc., Plantation, FL (US)

( * ) Notice: Subject to any disclaimer, the term of this patent is extended or adjusted under 35 U.S.C. 154(b) by 85 days.

(21) Appl. No.: 17/127,415

(22) Filed: Dec. 18, 2020

(65) Prior Publication Data
US 2021/0195092 A1     Jun. 24, 2021

Related U.S. Application Data

(60) Provisional application No. 62/950,879, filed on Dec. 19, 2019.

(51) Int. Cl.
*H04N 5/232*      (2006.01)
*H04N 5/235*      (2006.01)
*G06V 10/60*      (2022.01)

(52) U.S. Cl.
CPC ......... *H04N 5/23216* (2013.01); *G06V 10/60* (2022.01); *H04N 5/2351* (2013.01); *H04N 5/2353* (2013.01)

(58) Field of Classification Search
CPC ............. H04N 5/23216; H04N 5/2351; H04N 5/2353; H04N 5/243; H04N 5/2355;
(Continued)

(56) References Cited

U.S. PATENT DOCUMENTS

| 5,033,029 A | 7/1991 | Jones |
| 5,333,029 A | 7/1994 | Uchiyama et al. |

(Continued)

FOREIGN PATENT DOCUMENTS

| JP | 06326919 A | 11/1994 |
| JP | 1023324 A | 1/1998 |

(Continued)

OTHER PUBLICATIONS

Application No. AU2017382721, "Second Examination Report", dated Apr. 22, 2022, 2 pages.
(Continued)

*Primary Examiner* — Twyler L Haskins
*Assistant Examiner* — Angel L Garces-Rivera
(74) *Attorney, Agent, or Firm* — Kilpatrick Townsend & Stockton LLP

(57) ABSTRACT

A method includes capturing an image using a content capture device with an initial image setting. The image includes a plurality of pixel groups, and a pixel group can have one or more pixels. A plurality of edge pixel groups is identified and then classified into two subsets. A first subset of saturated edge pixel groups includes edge pixel groups that have at least one neighboring pixel group with an image intensity exceeding a saturated intensity value. A second subset of non-saturated edge pixel groups includes edge pixel groups that have no neighboring pixel groups with an image intensity exceeding a saturated intensity value. An adjustment value to the image setting is determined based on a total number of saturated edge pixel groups and a total number of non-saturated edge pixel groups. An updated image is captured with an updated image setting based on the adjustment value.

20 Claims, 12 Drawing Sheets

(58) Field of Classification Search
CPC .... G06V 10/60; G06K 9/2027; G06K 9/4604; G06T 2207/10148; G06T 2207/30168; G06T 7/0002
See application file for complete search history.

(56) References Cited

U.S. PATENT DOCUMENTS

| | | | |
|---|---|---|---|
| 7,903,141 | B1 | 3/2011 | Mariano et al. |
| 8,237,853 | B2 | 8/2012 | Takahashi |
| 10,701,276 | B2 | 6/2020 | Smith et al. |
| 11,303,818 | B2 | 4/2022 | Smith et al. |
| 2007/0052840 | A1 | 3/2007 | Okuno |
| 2009/0003678 | A1 | 1/2009 | Cutler |
| 2010/0296698 | A1 | 11/2010 | Lien et al. |
| 2011/0268369 | A1 | 11/2011 | Richards et al. |
| 2011/0293259 | A1 | 12/2011 | Doepke et al. |
| 2013/0057654 | A1 | 3/2013 | Rafii et al. |
| 2013/0128075 | A1 | 5/2013 | Lukac |
| 2014/0341467 | A1 | 11/2014 | Seo |
| 2015/0264241 | A1 | 9/2015 | Kleekajai et al. |
| 2016/0277724 | A1 | 9/2016 | Linaker |
| 2017/0061237 | A1 | 3/2017 | Kobayashi |
| 2017/0078551 | A1 | 3/2017 | Kweon et al. |
| 2017/0374254 | A1 | 12/2017 | Miyazaki |
| 2018/0183986 | A1 | 6/2018 | Smith et al. |
| 2020/0351427 | A1 | 11/2020 | Smith et al. |

FOREIGN PATENT DOCUMENTS

| | | | |
|---|---|---|---|
| JP | 2007072013 | A | 3/2007 |
| JP | 2007074163 | A | 3/2007 |
| JP | 4149413 | A | 9/2008 |
| JP | 4163537 | A | 10/2008 |
| JP | 5005925 | A | 8/2012 |
| JP | 6326919 | A | 5/2018 |

OTHER PUBLICATIONS

Application No. EP17883301.8, Notice of Decision to Grant, dated May 19, 2022, 2 pages.
Application No. JP2019-533404, Office Action and English Translation, dated Apr. 5, 2022, 9 pages.
Zhang, et al., "Active Exposure Control for Robust Visual Odometry in HDR Environments", retrieved from internet https://youtuve/TKJ8vknIXbM on Oct. 21, 2019, 9 pages.
U.S. Appl. No. 16/879,468, Notice of Allowance, dated Dec. 8, 2021, 8 pages.
IN201947022049, "First Examination Report", dated Dec. 17, 2021, 9 pages.
Application No. JP2019-533404, Office Action and English Translation, dated Dec. 3, 2021, 14 pages.
U.S. Appl. No. 16/879,468, Non-Final Office Action, dated Jul. 9, 2021, 14 pages.
AU2017382721, English Translation and "First Examination Report", dated Oct. 5, 2021, 5 pages.
Application No. IL267412, English Translation and Office Action, dated Jul. 11, 2021, 11 pages.
Application No. EP22177425.0, "Partial Supplementary European Search Report", dated Aug. 18, 2022, 11 pages.

| Adjustment ... Exp/Gain ⇑ | Adjustment ... Exp/Gain ⇓ | Effect on gradient strength to category: | Description |
|---|---|---|---|
| ⇕ | ⇕ | (1.1) No-detect: no edge exists | Adjustments have no effect |
| ⇑ | ⇓ | (1.2) No-detect: Below thresh. / noise | Adjust up = stronger gradient & better detection probability<br>Adjust dn = weaker gradient, but already not-detected |
| ⇑ | ⇓ | (2.1) Detected: no-saturation | Adjust up = stronger gradient until one side reaches saturation<br>Adjust dn = weaker gradient until falls below detection threshold |
| ⇓ | ⇑ | (2.2) Detected: saturation | Adjust up = weaker gradient as non-sat side gets closer to saturation<br>Adjust dn = stronger gradient as diff increases until both sides non-saturated |

FIG. 3A

GRADIENT-BASED EXPOSURE AND GAIN CONTROL TECHNIQUES

CROSS-REFERENCES TO RELATED APPLICATIONS

This application claims the benefit of priority to U.S. Provisional Patent Application No. 62/950,879, filed Dec. 19, 2019, entitled "GRADIENT-BASED EXPOSURE AND GAIN CONTROL TECHNIQUES," the contents of which is hereby incorporated by reference in its entirety for all purposes.

BACKGROUND OF THE INVENTION

This disclosure generally relates to determining settings (such as an exposure setting or a gain setting) for a content capture device. The exposure setting may relate to an amount of light a sensor of a content capture device receives when a content (e.g., an image or a video) is captured. Examples of exposure settings include a shutter speed, an aperture setting, or an International Standards Organization (ISO) speed.

Automatic exposure control (AEC) is a standard feature on cameras. AEC automatically determines exposure settings for an image without user input. Using AEC, a camera may determine an exposure setting for the camera. Conventional approach uses feedback mechanism to adjust the settings for automatic exposure control (AEC) and automatic gain control (AGC) to create an optimal image for consumption by a human. The conventional techniques often analyze light hitting the sensor and try to find a balance to achieve a well-exposed, high-contrast image. This approach may be adequate for producing a visually appealing image, such that on average, objects are hopefully neither too bright, nor too dark.

However, conventional AEC/AGC techniques are not optimized for computer vision (CV) and simultaneous localization and mapping (SLAM). Therefore, there is a need in the art for improved exposure and gain control techniques.

SUMMARY OF THE INVENTION

Embodiments of the present invention provides a gradient-driven exposure and gain control system, where the automatic exposure control (AEC)/automatic gain control (AGC) makes decisions not based on image intensity alone but on the gradient of image intensity. The gradient-based control techniques can increase performance in many applications, including in an HDR (High Dynamic Range) environment with bright lamps or windows, an environment with low light or limited features that provide limited information, and scenes with particular textures or lighting conditions, e.g., edge cases. Further, embodiments of the present invention also enable optimized image settings for corner detection. Considering that low detection thresholds tend to select noise-gradients in brighter regions, and higher detection thresholds tend to ignore image-gradients in darker regions, a gradient classification method is provided for determining the image gradients. This differs from conventional techniques which use derivatives of prior frames alone.

According to some embodiments of the present invention, a method includes capturing an image using a content capture device with an initial image setting. The image includes a plurality of pixels, each pixel having a respective image intensity. A gradient vector is determined for each of the plurality of pixels. The gradient vector for a given pixel includes differences in image intensity between the given pixel and one or more neighboring pixels of the given pixel. The method includes identifying a plurality of edge pixels, wherein the gradient vector for each of the plurality of edge pixels exceeds a first threshold value. For each edge pixel of the plurality of edge pixels, it is determined if an image intensity of one or more neighboring pixels of the edge pixel exceeds a second threshold value. In response to determining that the image intensity of at least one of the one or more neighboring pixels exceeds the second threshold value, the edge pixel is classified as a saturated edge pixel, and, otherwise, the edge pixel is classified as a non-saturated edge pixel. The method further includes determining a total number of saturated edge pixels and a total number of non-saturated edge pixels, forming an updated image setting based on the total number of saturated edge pixels, and the total number of non-saturated edge pixels, and capturing an updated image using the content capture device with the updated image setting.

In some embodiments of the above method, the image setting includes one or more of an exposure, a gain of an image sensor in the content capture device.

In some embodiments of the above method, the updated image setting includes a ratio of a long exposure time to a short exposure time for a two-frame HDR configuration of an image sensor in the content capture device.

In some embodiments, the above method also includes repeating capturing an updated image and updating the image setting until a figure of merit is reached. In an $n^{th}$ iteration, n being an integer, the total number of saturated edge pixels is designated as "$s_n$" and the total number of non-saturated edge pixels is designated as "$m_n$".

In some embodiments of the above method, forming an updated image setting includes determining an error value ("En") based on the total number of saturated edge pixels ("$s_n$") and the total number of non-saturated edge pixels ("$m_n$"), and using a proportional-integral-derivative (PID) controller to determine an adjustment value to the image setting.

In some embodiments of the above method, the error value is defined as:

$$E_n = \frac{m_n - s_n}{m_n + s_n}$$

wherein:
$E_n$ is the error value for the $n^{th}$ image obtained by the system;
$m_n$ is the quantity of edges detected in the $n^{th}$ image that are classified as not saturated; and
$s_n$ is the quantity of edges detected in the $n^{th}$ image that are classified as saturated.

In some embodiments of the above method, the adjustment value An is defined as:

$$A_n = K_p E_n + K_i \sum_{j=n_0}^{n} E_j + K_d(E_n - E_{n-1})$$

wherein:
$A_n$ is the adjustment to be made by the system based on the $n^{th}$ image;
$K_p$ is the proportional gain tuning parameter;

$K_i$ is the integral gain tuning parameter;
$K_d$ is the derivative gain tuning parameter; and
w is the window size (predefined constant value).

In some embodiments of the above method, forming an updated image setting includes comparing the total number of saturated edge pixels ("$s_n$") and the total number of non-saturated edge pixels ("$m_n$"), increasing the image setting in response to determining that $m_n > s_n$, decreasing the image setting in response to determining that $m_n < s_n$, and making no adjustment to the image setting in response to determining that $m_n = s_n$.

In some embodiments of the above method, the figure of merit is reached when the total number of saturated edge pixels ("$s_n$") is equal to the total number of non-saturated edge pixels ("$m_n$").

In some embodiments of the above method, the figure of merit is reached when a difference between the total number of saturated edge pixels ("$s_n$") and the total number of non-saturated edge pixels ("$m_n$") is less than a preset value.

In some embodiments of the above method, identifying a plurality of edge pixels includes determining a 2-D gradient vector having a first intensity gradient in a first direction and a second intensity gradient in a second direction.

According to some embodiments of the present invention, a content capture device includes an image sensor for capturing an image with an image setting, wherein the image includes a plurality of pixel groups, each pixel group including one or more pixels, each pixel group having a respective image intensity. An edge detection and classification module is coupled to the image sensor and is configured to identify a plurality of edge pixel groups, and classify the plurality of edge pixel groups into two subsets. A first subset of saturated edge pixel groups includes edge pixel groups that have at least one neighboring pixel group with an image intensity exceeding a saturated intensity value. A second subset of non-saturated edge pixel groups includes edge pixel groups that have no neighboring pixel groups with an image intensity exceeding a saturated intensity value. The device also includes an image sensor control module coupled to the edge detection and classification module and the image sensor to form a feedback loop. The image sensor control module is configured to determine an adjustment value to the image setting based on a total number of saturated edge pixel groups and a total number of non-saturated edge pixel groups. The content capture device is configured to capture an updated image using the image sensor with an updated image setting based on the adjustment value.

In some embodiments of the above device, the content capture device is configured to repeat capturing an updated image and updating the image setting until a figure of merit is reached. In an $n^{th}$ iteration, n being an integer, the total number of saturated edge pixel groups is designated as "$s_n$" and the total number of non-saturated edge pixel groups designated as "$m_n$".

In some embodiments of the above device, the image sensor control module is configured to determine an error value ("En") based on the total number of saturated edge pixel groups ("$s_n$") and the total number of non-saturated edge pixel groups ("$m_n$"), and use a proportional-integral-derivative (PID) controller to determine an adjustment value to the image setting.

In some embodiments of the above device, the error value is defined as:

$$E_n = \frac{m_n - s_n}{m_n + s_n}$$

wherein:
$E_n$ is the error value for the $n^{th}$ image obtained by the system;
$m_n$ is the quantity of edges detected in the $n^{th}$ image that are classified as not saturated;
$s_n$ is the quantity of edges detected in the $n^{th}$ image that are classified as saturated.

In some embodiments of the above device, the adjustment value An is defined as:

$$A_n = K_p E_n + K_i \sum_{j=n_0}^{n} E_j + K_d(E_n - E_{n-1})$$

$$n_0 = \begin{cases} 1, & n \leq w \\ n - w, & n > w \end{cases}$$

wherein:
$A_n$ is the adjustment to be made by the system based on the $n^{th}$ image;
$K_p$ is the proportional gain tuning parameter;
$K_i$ is the integral gain tuning parameter;
$K_d$ is the derivative gain tuning parameter; and
w is the window size (predefined constant value).

In some embodiments of the above device, the image sensor control module is configured to compare the total number of saturated edge pixels ("$s_n$") and the total number of non-saturated edge pixels ("$m_n$"), increase the image setting in response to determining that $m_n > s_n$, decrease the image setting in response to determining that $m_n < s_n$, and make no adjustment to the image setting in response to determining that $m_n = s_n$.

According to some embodiments of the present invention, a method includes capturing an image with an image setting, wherein the image includes a plurality of pixel groups, each pixel group including one or more pixels, each pixel group having a respective image intensity. A plurality of edge pixel group is identified, and the plurality of edge pixel groups are classified into two subsets. A first subset includes saturated edge pixel groups, in which each edge pixel group has at least one neighboring pixel group with an image intensity exceeding a saturated intensity value. A second subset includes non-saturated edge pixel groups in which each edge pixel group has no neighboring pixel groups with an image intensity exceeding a saturated intensity value. The method also includes determining an adjustment value to the image setting based on a total number of saturated edge pixel groups and a total number of non-saturated edge pixel groups. The method further includes capturing an updated image with an updated image setting based on the adjustment value.

In some embodiments of the above method, also includes repeating capturing an updated image and updating the image setting until a figure of merit is reached.

In some embodiments of the above method, determining an adjustment value to the image setting includes determining an error value based on the total number of saturated edge pixel groups and the total number of non-saturated edge pixel groups, and using the error value in a proportional-integral-derivative (PID) controller to determine the adjustment value to the image setting.

In some embodiments of the above method, determining an adjustment value to the image setting includes comparing the total number of saturated edge pixel groups ("$s_n$") and the total number of non-saturated edge pixel groups ("$m_n$"). An adjustment value is determined based on the result of the comparison. For example, a positive adjustment value is selected to the image setting in response to determining that $m_n > s_n$, and a negative adjustment value is selected to the image setting in response to determining that $m_n < s_n$. In response to determining that $m_n = s_n$, no adjustment is made to the image setting.

BRIEF DESCRIPTION OF THE DRAWINGS

Illustrative embodiments are described in detail below with reference to the following figures.

FIG. 3A illustrates a table showing the effect of adjusting image settings of a content capture device according to various embodiments of the present invention;

DETAILED DESCRIPTION OF THE INVENTION

In the following description, for the purposes of explanation, specific details are set forth in order to provide a thorough understanding of embodiments of this disclosure. However, it will be apparent that various embodiments may be practiced without these specific details. The figures and description are not intended to be restrictive.

The ensuing description provides exemplary embodiments only, and is not intended to limit the scope, applicability, or configuration of this disclosure. Rather, the ensuing description of the exemplary embodiments will provide those skilled in the art with an enabling description for implementing an exemplary embodiment. For example, while the description might describe pixel information, images, and/or displaying, it should be recognized that audio may be generated and presented to a user by an augmented reality device instead of or in addition to visual content. It should also be understood that various changes may be made in the function and arrangement of elements without departing from the spirit and scope of the disclosure as set forth in the appended claims.

According to some embodiments, a method is provided for a gradient-based exposure and/or gain adjustment. The method includes capturing an image using a content capture device with an initial image setting. The image including a plurality of pixel groups, and a pixel group can have one or more pixels. A plurality of edge pixel groups is identified and then classified into two subsets. A first subset of saturated edge pixel groups includes edge pixel groups that have at least one neighboring pixel group with an image intensity exceeding a saturated intensity value. A second subset of non-saturated edge pixel groups includes edge pixel groups that have no neighboring pixel groups with an image intensity exceeding the saturated intensity value. As used herein, the saturated intensity value is the maximum image intensity provided by the image sensor, which cannot be further increased by higher exposure or gain settings. An adjustment value to the image setting is determined based on a total number of saturated edge pixel groups and a total number of non-saturated edge pixel groups. An updated image is captured with an updated image setting based on the adjustment value.

Figure 1:
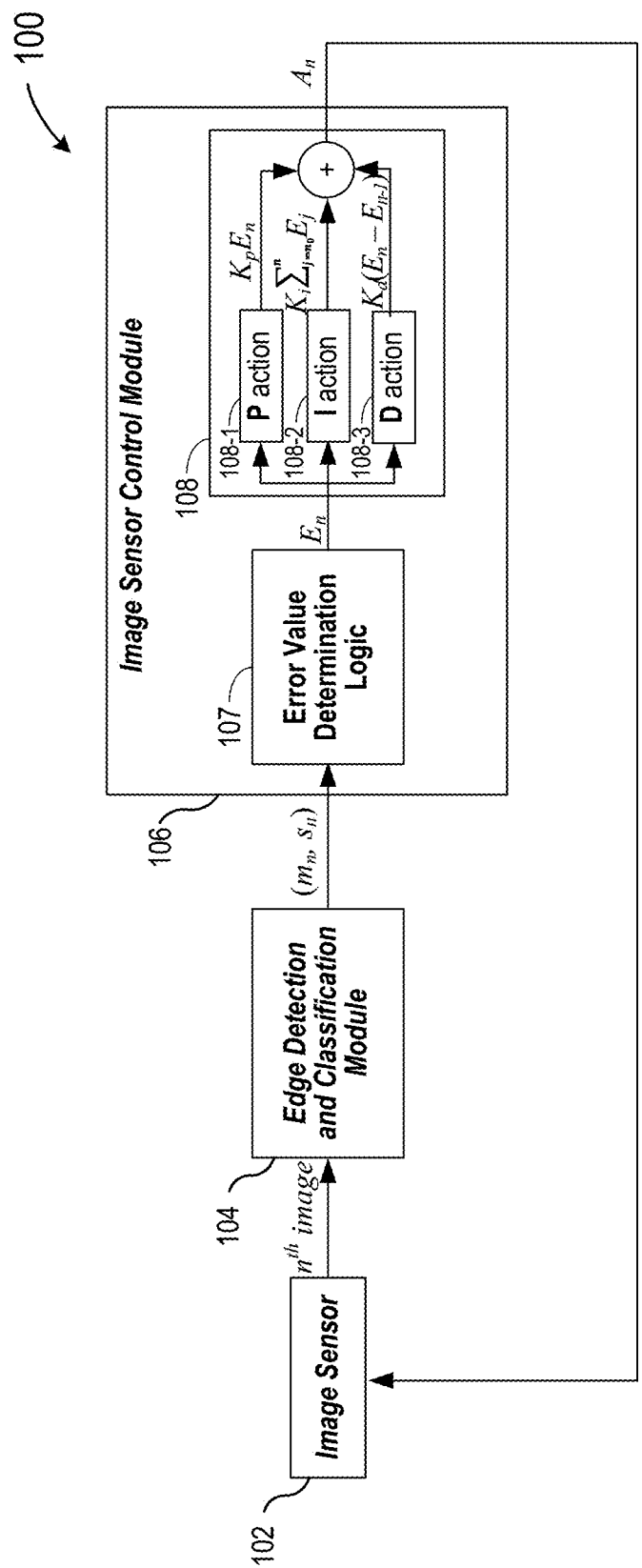
FIG. 1 illustrates a block diagram for an exemplary content capture device with gradient-based exposure and gain control according to various embodiments of the present invention.

FIG. 1 illustrates a block diagram for an exemplary content capture device with gradient-based exposure and gain control according to various embodiments of the present invention. As shown in FIG. 1, a content capture device 100 that includes an image sensor 102, an edge detection and classification module 104, and image sensor control module 106. Image sensor 102 can include CMOS (Complementary Metal-Oxide-Semiconductor), CCD (Charge Coupled Device), or other optical/imaging device configured to capture images. For example, the image sensor 102 may correspond to an outward-facing imaging device of a wearable system. In some embodiments, the image sensor 102 may be configured to capture images of an environment of a user of the wearable system. As described in further detail below, one or more imaging settings of the image sensor 102 (e.g., gain and/or exposure) may be controlled by the image sensor control module 106 in a feedback system. In some implementations, the one or more imaging settings of the image sensor 102 may include one or more settings for capturing HDR images, such as the long exposure time, the short exposure time, and/or a ratio of the long exposure time to the short exposure time.

Edge detection and classification module 104 can include one or more kernels, image processing logic, etc. For example, the functionality of the edge detection and classification module 104 may be provided by way of one or more processors of the wearable device in communication with the image sensor 102. In some embodiments, the edge detection and classification module 104 may be configured to receive images of the environment of the user of the wearable system as captured by the image sensor 102, and further configured to detect and classify edges in each image received.

Image sensor control module 106 can include, for example, a proportional-integral-derivative (PID) controller, a PID-like control logic, etc. The functionality of the edge detection and classification module 104 may be provided by way of one or more processors of the wearable system in communication with the image sensor 102. In some embodiments, the image sensor 102 can include one or more processors, and some or all of the functionality of module 104 is provided by way of the one or more processors of the image sensor 102. In some embodiments, the image sensor control module 106 may be configured to control one or more imaging settings of the image sensor 102 (e. g., gain and/or exposure) based at least in part on the edges detected and classified by the edge detection and classification module 104.

According to some embodiments, a content capture device, such as device 100 in FIG. 1, can be configured to perform the following functions. Image sensor 102 can be configured for capturing an image with an image setting. The image can include a plurality of pixel groups. Each pixel group can include one or more pixels, each pixel group having a respective image intensity. Edge detection and classification module 104 is coupled to the image sensor 102, and is configured to identify a plurality of edge pixel groups, and classify the plurality of edge pixel groups into two subsets. A first subset of saturated edge pixel groups includes edge pixel groups that have at least one neighboring pixel group with an image intensity exceeding a saturated intensity value. A second subset of non-saturated edge pixel groups includes edge pixel groups that have no neighboring pixel groups with an image intensity exceeding a saturated intensity value. Image sensor control module 106 is coupled to the edge detection and classification module 104 and the image sensor 102 to form a feedback loop. The image sensor control module is configured to determine an adjustment value to the image setting, based on a total number of saturated edge pixel groups and a total number of non-saturated edge pixel groups. The content capture device 100 is further configured to capture an updated image using the image sensor 102 with an updated image setting based on the adjustment value.

Figure 2:
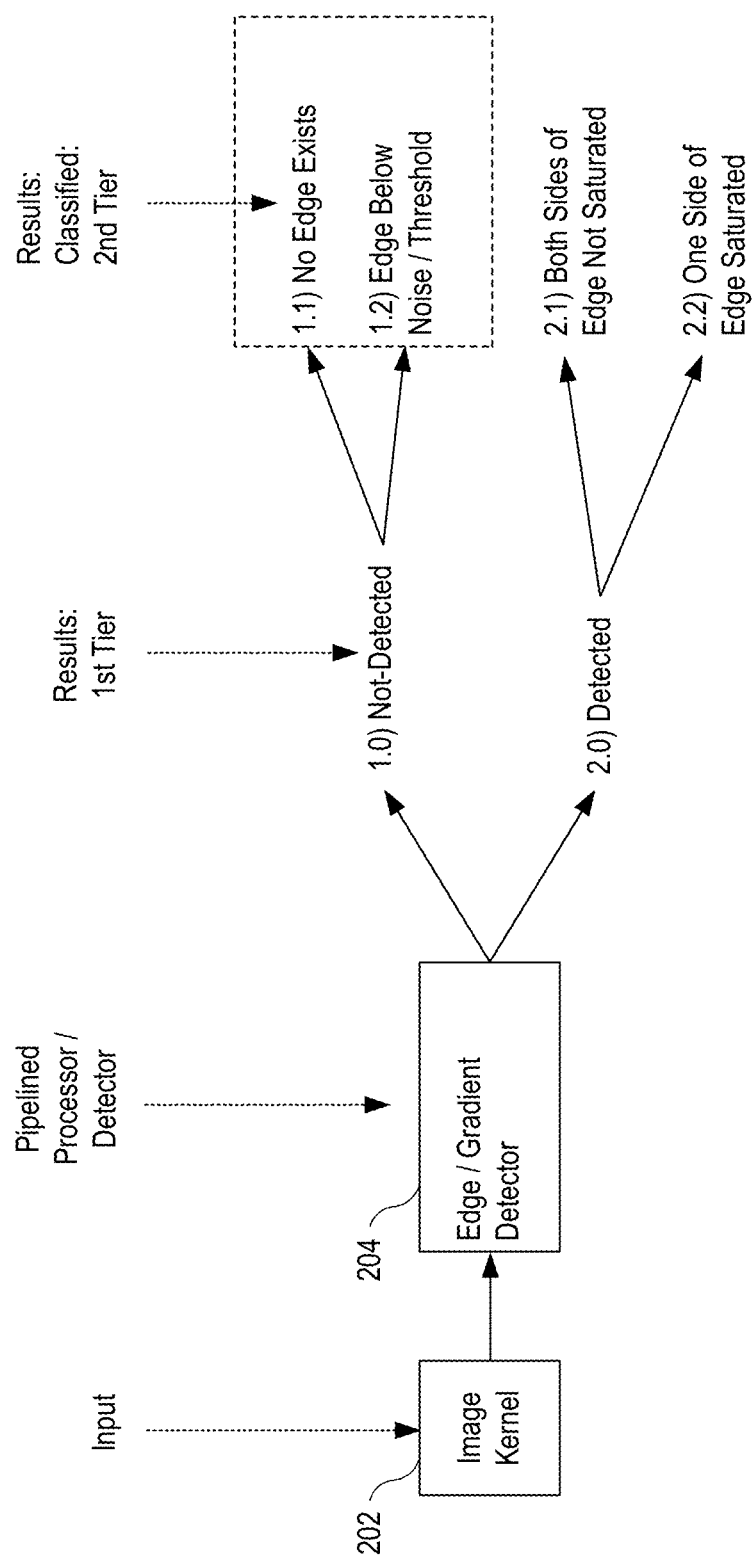
FIG. 2 illustrates an example of a block diagram for edge detection and classification of a content capture device according to various embodiments of the present invention.

FIG. 2 illustrates an example of a block diagram for edge detection and classification of a content capture device according to various embodiments of the present invention. As shown in FIG. 2, an image kernel 202 receives an input and passes it to an edge and gradient detector 204 for edge detection. The edge and gradient detector 204 performs a first tier classification and classifies the pixels into two groups:

A first group (1.0) includes the pixels in the image where an edge is not detected; and A second group (2.0) includes the pixels in the image where an edge is detected.

The edge and gradient detector 204 can perform a second tier classification and classifies each group of the pixels into two subgroups. For example, the first group (1.0) is divided into two subgroups:

A first subgroup (1.1) includes the pixels in the image where no edge exists; and A second subgroup (1.2) includes the pixels in the image where an edge may exist but is below a noise or threshold level.

Similarly, the second group (2.0) is divided into two subgroups:

A first subgroup (2.1) includes the pixels in the image where both sides of the edge are not saturated; and A second subgroup (2.2) includes the pixels in the image where one side of the edge is saturated.

FIG. 3A illustrates a table showing the effect of adjusting image settings of a content capture device according to various embodiments of the present invention. As shown in FIG. 3A, the table illustrates the effect of adjusting the image settings, e.g., an exposure and/or gain, on edge detection for each of the subgroups described above in connection with FIG. 2. For example, for subgroup (1.1) where no edge exists, adjusting the image setting up or down will have no effect on the result of edge detection. For subgroup (1.2) where an edge may exist but is below a noise or threshold level, adjusting the image setting up can lead to a stronger gradient and better edge detection probability. On the other hand, adjusting the image setting down can lead to a weaker gradient and the edge will remain undetected. For subgroup (2.1) where both sides of the edge are not saturated, adjusting the image setting up can lead to stronger gradient and better edge detection probability, until one side reaches saturation. For this subgroup, adjusting the image setting down can lead to a weaker gradient until the gradient falls below the detection threshold. For subgroup (2.2) where one side of the edge is saturated, adjusting the image setting up can lead to a weaker gradient because the non-saturated side moves closer to saturation. For this subgroup, adjusting the image setting down can lead to a stronger gradient as the difference in image intensity increases until both sides becomes non-saturated. In the description below, pixels in subgroup (2.1), where both sides of the edge are not saturated, are referred to as non-saturated edge pixels. Similarly, pixels in subgroup (2.2), where one side of the edge is saturated, are referred to as saturated edge pixels.

Figure 3B:
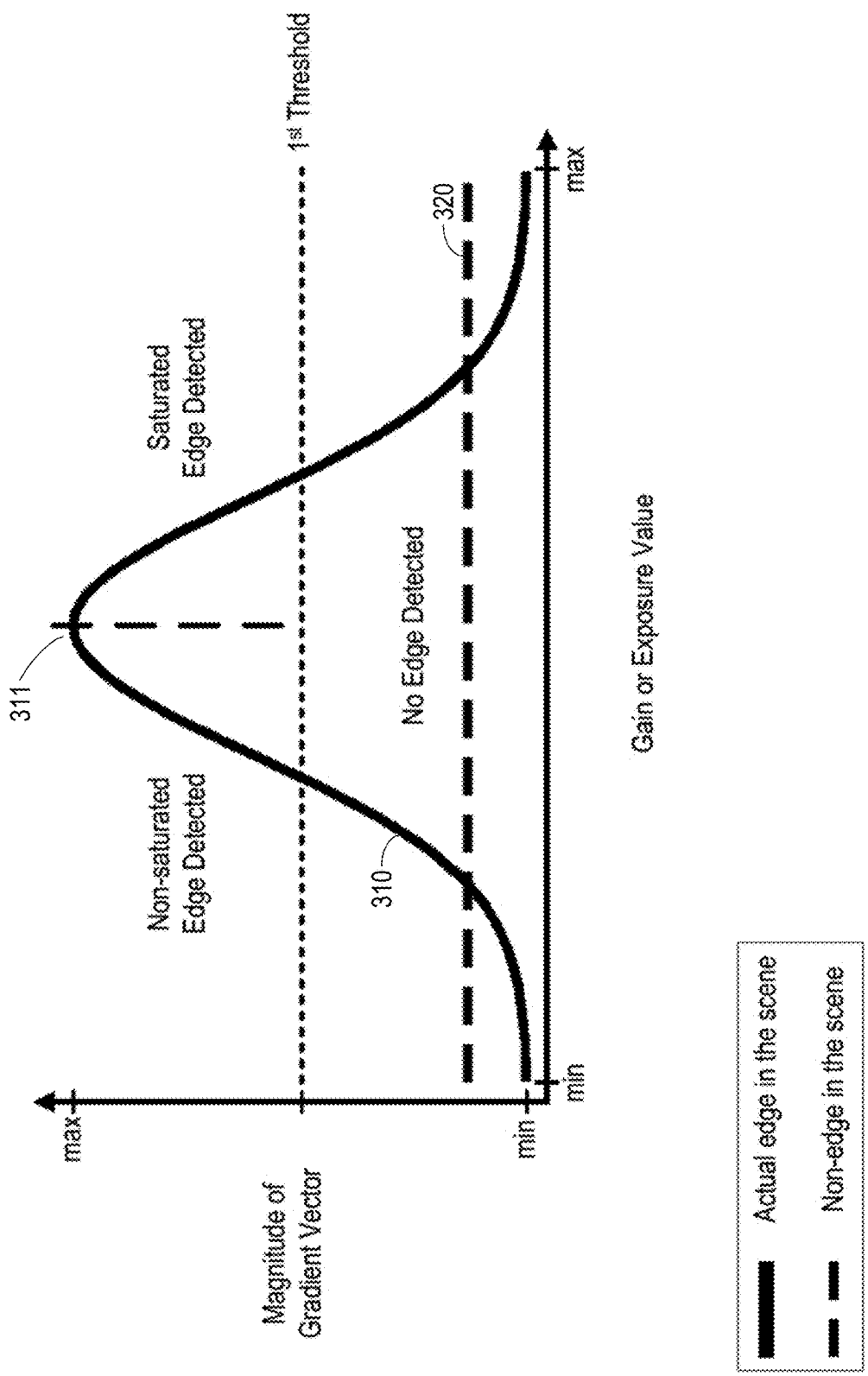
FIG. 3B illustrates a plot showing the effects of adjusting image settings of a content capture device according to various embodiments of the present invention.

FIG. 3B illustrates a plot showing the effects of adjusting image settings of a content capture device according to various embodiments of the present invention. In FIG. 3B, the horizontal axis shows the gain or exposure value from a minimum to a maximum. The vertical axis shows the magnitude of gradient vector from a minimum to a maximum. Curve 310 illustrates the magnitude of the gradient vector at a pixel as a function of the gain or exposure value. In this example, the magnitude of the gradient vector is compared with a first threshold for edge detection. If the magnitude of the gradient vector is greater than the first threshold, then the pixel is classified as an edge pixel. It can be seen that as the gain or exposure value increases from the minimum value, the magnitude of the gradient vector 310 increases, until it reaches a peak point 311. At the peak point 311, the image intensity at one side of the edge reaches a maximum. If the gain or exposure value increases further, the magnitude of the gradient vector 310 starts to decrease. In contrast, curve 320 illustrates the magnitude of the gradient vector at pixel not at an edge. It can be seen that the magnitude of gradient vector is not a function of the gain or exposure value. In some examples, points along curve 320 may correspond to pixels in subgroup (1.1), while points along curve 310 that are below the first threshold may correspond to pixels in subgroup (1.2). Similarly, in some examples, points along curve 310 that are above the first threshold and to the left of peak point 311 may correspond to pixels in subgroup (2.1), while points along curve 310 that are above the first threshold and to the right of peak point 311 may correspond to pixels in subgroup (2.2).

FIGS. 2, 3A, and 3B illustrate the effects of exposure/gain adjustments on the classified detections of edge features. As can be seen, a given direction of adjustment can impact each category differently, and can have the effect of pushing detection from one category into another. Without determining or knowing the gradient/edge strength of each detection (or non-detection), information can be obtained regarding the expected net number of increases in gradient/edge strength versus the number of decreases in gradient/edge strength, by keeping a count of the number of detections (or non-detections) in each category. The system reaches a balance when the number of "detected and non-saturated" equals the number of "detected and saturated". This is the point where the likelihood of losing detections to saturation is equally high as compared with the likelihood of losing detections to below noise/threshold. Therefore, in some embodiments, the goal or target of the control system is to reach 50% of detections as "non-saturated" and 50% of the detections as "saturated". Further, in some cases, the detection threshold are set strong enough to avoid mis-detections at the saturation boundaries where no actual edge/feature exists.

In some embodiments of the present invention, the metrics can be calculated all from within a single frame, and the direction of adjustment can be determined without the need of a-priori knowledge from any previous frames. In some embodiments, a-priori knowledge from one or more previous frames may also be used. For example the integral portion of the PID controller provides a rolling window of past error history. Edge detections can be maximized for a given threshold.

In embodiments of the present invention, a method for improving edge detection of an image described above can be implemented in image capture device 100 of FIG. 1. The method includes capturing an image with an image setting, using, for example, image sensor 102 in FIG. 1. The image can include a plurality of pixel groups. Each pixel group can include one or more pixels, and each pixel group can have a respective image intensity. Next, edge pixel groups are identified, and the edge pixel groups are classified into two subsets, for example, using the process described above in connection with edge detection and classification module 104 in FIG. 1 and with reference to FIGS. 2, 3A, and 3B. A first subset of saturated edge pixel groups includes edge pixel groups that have at least one neighboring pixel group with an image intensity exceeding a saturated intensity value. A second subset of non-saturated edge pixel groups includes edge pixel groups that have no neighboring pixel groups with an image intensity exceeding a saturated intensity value. As shown in FIG. 1, the edge detection and classification module 104 receives an nth image from image sensor 102 in the nth iteration of the feedback control loop in FIG. 1, and provides two parameters: "$s_n$," which represents the total number of saturated edge pixels, and "$m_n$," which represents the total number of non-saturated edge pixels.

As illustrated in FIG. 1, image sensor control module 106 receives parameters "$s_n$" and "$m_n$," which represent the total number of saturated edge pixels and the total number of non-saturated edge pixels, respectively. In the example of FIG. 1, image sensor control module 106 includes an error value determination logic 107 and a proportional-integral-derivative (PID) controller 108. The PID controller 108 includes a proportional action (P action) block 108-1, an integral action (I action) block 108-2, and a derivative action (D action) block 108-3.

A PID controller is configured for proportional, integral, and derivative control in a closed feedback loop to get the desirable results. A sensor provides the current value and adjustments are made to reach the desired value. In a conventional PID controller, the adjustment value is based on an error value which is the difference between the current value and the desired value or a target value. The proportional action block provides a first adjustment value based on the current error value. The integral action block provides a second adjustment value based on an integral of error values over a period of time, which represents a recent history of the error value. The derivative action block determines a third adjustment value based on the derivative of the error values or the current rate of change of the error value, which can be used as an estimation of the future trend of the error value.

The inventors have observed that the conventional PID (Proportional-Integral-Derivative) controller cannot be used directly in the device and method described herein. First, there does not exit a classical "target" value as defined for the conventional PID controller. For example, the maximum number of edges that will be detected is scene dependent, and cannot be determined in advance for the PID controller. Further, a target cannot be determined in advance when the non-saturated detections will equal to the saturated detections.

Therefore, embodiments of the present invention provide a PID controller that does not define the error value as the difference between the current value and a final target value. As shown in FIG. 1, error value determination logic 107 provides an error value $E_n$, which is defined based on a difference between "$m_n$", which represents the total number of non-saturated edge pixels, and "$s_n$", which represents the total number of saturated edge pixels. For example, in some embodiments, the error value $E_n$ is defined as follows, $$E_n = \frac{m_n - s_n}{m_n + s_n}$$

where "$m_n$" is the total number of non-saturated edge pixels, and "$s_n$" is the total number of saturated edge pixels.

The adjustment $A_n$ is defined as follows:

$$A_n = K_p E_n + K_i \sum_{j=n_0}^{n} E_j + K_d(E_n - E_{n-1})$$

$$n_0 = \begin{cases} 1, & n \leq w \\ n - w, & n > w \end{cases}$$

where:
$A_n$ is the adjustment to be made by the system based on the $n^{th}$ image;
$K_p$ is the proportional gain tuning parameter;
$K_i$ is the integral gain tuning parameter;
$K_d$ is the derivative gain tuning parameter; and
w is the window size (predefined constant value).

It can be seen from the PID controller 108 in FIG. 1 that the proportional action block 108-1 provides a first adjustment value $K_p E_n$ based on the current value of the error value $E_n$. The integral action block 108-2 provides a second adjustment value $K_i \sum_{j=n_0}^{n} E_j$ based on an integral of the error values $E_n$ over a period of time, which represents a recent history of the error. The derivative action block 108-3 determines a third adjustment value $K_d(E_n - E_{n-1})$ based on the derivative of the error $E_n$ or the rate of change of the error, which can be used as an estimate of the future trend of the error. In this example, the adjustment value $A_n$ is a sum of all three adjustment values. Adjustment value $A_n$ can be used to adjust the exposure and/or gain of the Image Sensor 102. The closed-loop control process described above continues until figure of merit is reached as described further below.

Figure 4:
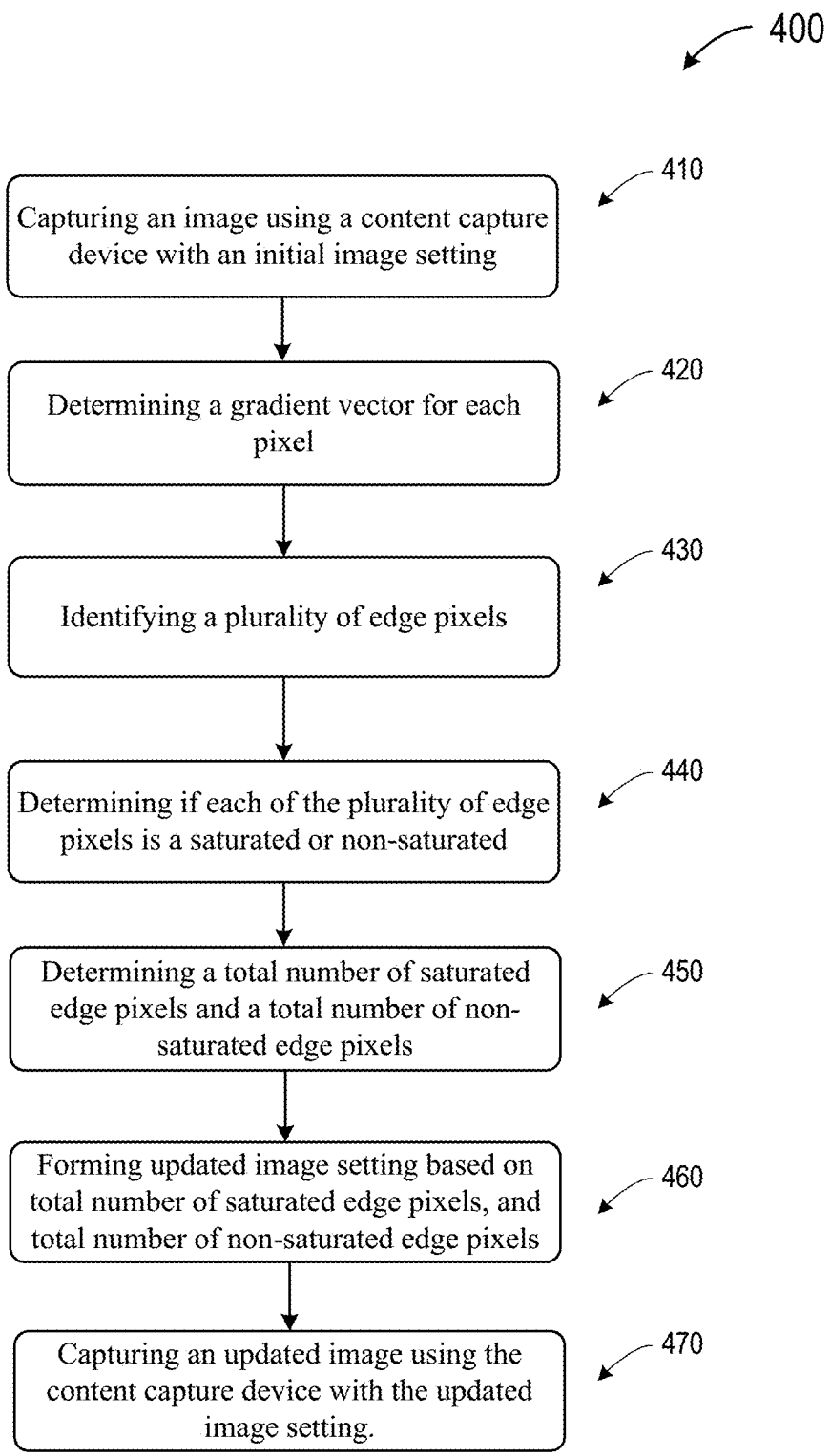
FIG. 4 is a flowchart illustrating an embodiment of a process for gradient-based exposure and gain control in a content capture device according to various embodiments of the present invention.

FIG. 4 is a flowchart illustrating an embodiment of a method for capturing an image using a gradient-based exposure and gain control in a content capture device according to various embodiments of the present invention. As shown in FIG. 4, method 400 includes, at 410, capturing an image using a content capture device with an initial image setting. The image can include a plurality of pixels, and each pixel can have a respective image intensity. At 420, a gradient vector is determined for each of the plurality of pixels. The gradient vector for a given pixel includes differences in image intensity between the given pixel and one or more neighboring pixels of the given pixel. At 430, a plurality of edge pixels are identified. The gradient vector for each of the plurality of edge pixels exceeds a first threshold value. At 440, the plurality of edge pixels is classified into two subsets. First, it is determined if an image intensity of one or more neighboring pixels of the edge pixel exceeds a second threshold value. In response to determining that the image intensity of at least one of the one or more neighboring pixels exceeds the second threshold value, the edge pixel is classified as a saturated edge pixel. Otherwise, the edge pixel is classified as a non-saturated edge pixel. The method further includes, at 450, determining a total number of saturated edge pixels and a total number of non-saturated edge pixels. At 460, an updated image setting is formed based on the total number of saturated edge pixels and the total number of non-saturated edge pixels. At 470, an updated image is captured using the content capture device with the updated image setting. A more detailed description is presented below with reference to FIG. 5.

It should be appreciated that the specific steps illustrated in FIG. 4 provide a particular method of capturing an image using a gradient-based exposure and gain control in a content capture device according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 5:
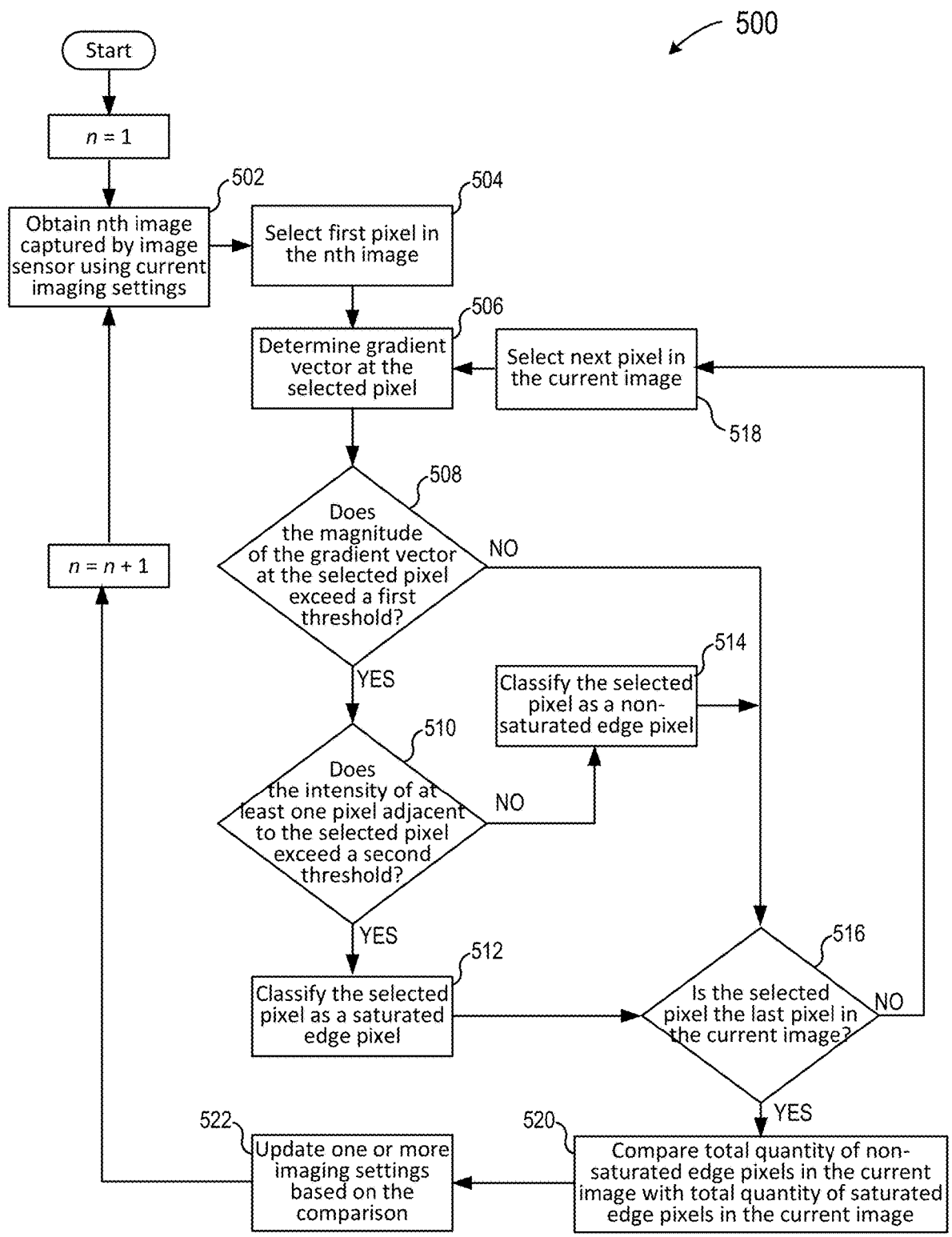
FIG. 5 is a flowchart illustrating another embodiment of a process for gradient-based exposure and gain control in a content capture device according to various embodiments of the present invention.

FIG. 5 is a flowchart illustrating another embodiment of a process for gradient-based exposure and gain control in a content capture device according to various embodiments of the present invention. Process 500 may include steps 502-522, some or all of which may be performed by the content capture device 100 with gradient-based exposure and gain control illustrated above in FIG. 1. In this example, the process is described for each pixel. However, the process can be applied to pixel groups. In that case, the plurality of pixels of the image can be first divided into a plurality of pixel groups, in which a pixel group can have one or more pixels, and the pixel group is processed as a unit.

As shown in FIG. 5, the method 500 illustrates an iterative method. Method 500 can start by setting an index "n" to an initial value of 1. Next, at step 502, the edge detection and classification module 104 may receive an nth image captured by the image sensor 106. For example, n may initially correspond to a value of 1, and may increase with each additional image captured. For n=1, the image sensor 106 may use one or more default or otherwise predetermined imaging settings (e.g., default exposure and/or gain) to capture the nth image. However, for n>1, the image sensor 106 may capture the nth image using one or more imaging settings as updated at step 522, which is described in further detail below.

At steps 504-518, the edge detection and classification module 104 can be used to perform the following processes for each pixel in the nth image to determine a first number representing a total number of non-saturated edge pixels and a second number representing a total number of saturated edge pixels. The process can start by selecting a first pixel in the nth image, at 504.

At 506, the gradient vector is determined at the selected pixel. In some examples, the edge detection and classification module 104 may process the nth image (e.g., using a kernel) to determine a gradient vector at each pixel in the nth image. The gradient vector for a given pixel can include differences in image intensity between the given pixel and one or more neighboring pixels of the given pixel or between groups of neighbors. The given pixel does not necessarily need to factor into the calculation of the gradient vector, although the given pixel can provide the location. For example, the gradient vector/value may be computed from differences between the neighbors to the left vs. the neighbors to the right (or top vs. bottom), but the value of the given pixel location may be excluded from that computation.

At steps 508-514, the edge detection and classification module 104 may perform the following processes for each pixel to identify edge pixels. At step 508, it is determined whether the magnitude of the gradient vector of the pixel exceeds a first threshold value. The first threshold value can be static or dynamic, depending on environmental conditions, current camera settings, etc. In other words, at step 508, the edge detection and classification module 104 may determine whether the pixel is classified as an edge pixel in the nth image. In response to determining that the magnitude of the gradient vector of the pixel exceeds the first threshold value, the pixel is identified as an edge pixel. In some examples, one or more of the processes associated with step 508 may correspond to one or more of those associated with the first tier classification described above with reference to FIGS. 2 and 3A. Similarly, in some embodiments, the first threshold value utilized at step 508 may correspond to one or both of the first threshold described above with reference to FIG. 3B and the first threshold value described above with reference to FIG. 5.

Steps 510-514 are directed to processes involving edge pixels. At step 510, it is determined whether the intensity of at least one pixel adjacent to the pixel in the nth image (i.e., at least one neighboring pixel) exceeds a second threshold value, which is also referred to as a saturated value. In other words, at step 510, the Edge Detection and Classification Module 104 may determine whether the edge defined by the pixel in the nth image is saturated or non-saturated. In some examples, one or more of the processes associated with step 510 may correspond to one or more of those associated with the second tier classification described above with reference to FIGS. 2 and 3A.

At step 512, in response to determining that the intensity of at least one pixel adjacent to the pixel exceeds the second threshold value, the pixel is classified as a saturated edge pixel. The second threshold value can be static or dynamic, depending on environmental conditions, current camera settings, etc. In some examples, at step 512, the edge detection and classification module 104 may add the pixel to a list and/or tally of pixels in the nth image that are classified as saturated edge pixels.

At step 514, in response to determining that the intensity of all pixels adjacent to the pixel does not exceed the second threshold value, the pixel is classified as a non-saturated edge pixel. In some examples, at step 514, the edge detection and classification module 104 may add the pixel to a list and/or tally of pixels in the nth image that are classified as non-saturated edge pixels.

At step 516, the process determines whether the selected pixel is the last pixel in the current image. If not, the process proceeds to step 518 to select next pixel in the current image and loops back to step 506 to repeat the steps 508-516. If, at step 516, the process determines that the selected pixel is the last pixel in the current image, then the process proceeds to step 520.

At step 520, in transitioning from step 516 to step 520, the image sensor control module 106 may receive data from the edge detection and classification module 104 indicating how many pixels in the nth image were classified as non-saturated edge pixels ("$m_n$") and how many pixels in the nth image were classified as saturated edge pixels ("$s_n$"). At step 520, the image sensor control module 106 may compare the total quantity of non-saturated edge pixels detected in the nth image with the total quantity of non-saturated edge pixels detected in the nth image. The process can use different ways to determine an adjustment value to the image setting to obtain an updated image setting.

In a first example, at step 520, the image sensor control module 106 may determine an error value ("En") based on the total quantity of pixels in the nth image that were classified as non-saturated edge pixels ("$m_n$") and the total quantity of pixels in the nth image that were classified as saturated edge pixels ("$s_n$").

In a second example, at step 520, the image sensor control module 106 may simply determine whether the total quantity of non-saturated edge pixels detected in the nth image ("$m_n$") is greater than, less than, or equal to the total quantity of saturated edge pixels detected in the nth image ("$s_n$").

At step 522, the image sensor control module 106 may update one or more settings of the image sensor 102 (e.g., exposure and/or gain) based on the comparison of the total quantity of non-saturated edge pixels detected in the nth image with the total quantity of non-saturated edge pixels detected in the nth image. In some implementations, the one or more imaging settings of the image sensor 102 may include one or more settings for capturing HDR images settings, such as the long exposure time, the short exposure time, and/or a ratio of the long exposure time to the short exposure time.

In the above-mentioned first example, at step 522, the image sensor control module 106 may determine an adjustment ("$A_n$") to be made to one or more settings of the image sensor 102 based at least in part on the error value ("$E_n$"), for example, using the PID controller. The image sensor 102 may apply the adjustment ("$A_n$") to one or more settings and capture the next image.

In the abovementioned second example, at step 522, the image sensor control module 106 may perform one of the following steps:
  (i) increase the exposure and/or gain of the image sensor 102 in response to determining that $m_n > s_n$,
  (ii) decrease the exposure and/or gain of the image sensor 102 in response to determining that $m_n < s_n$, or
  (iii) make no adjustment to the exposure and/or gain of the image sensor 102 in response to determining that $m_n = s_n$.

Following step 522, the process 500 may return to step 502, at which point the edge detection and classification module 104 may receive the next image captured by the image sensor 106 using one or more imaging settings as determined at step 522. The process 500 may repeat capturing an updated image and updating the image setting until a figure of merit is reached. In an example, the figure of merit is reached when the total number of saturated edge pixels ("$s_n$") is equal to the total number of non-saturated edge pixels ("$m_n$"). In another example, the figure of merit is reached when a difference between the total number of saturated edge pixels ("$s_n$") and the total number of non-saturated edge pixels ("$m_n$") is less than a preset value. In still another example, the figure of merit is reached when a ratio between the total number of saturated edge pixels ("$s_n$") and the total number of non-saturated edge pixels ("$m_n$") reaches a preset value.

It should be appreciated that the specific steps illustrated in FIG. 5 provide a particular method of capturing an image using a gradient-based exposure and gain control in a content capture device according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

In order to determine the effectiveness of the gradient-based exposure and gain control techniques described above, different experiments were carried out. Some of the results are described below in connection with FIGS. 6-10.

Figure 6:
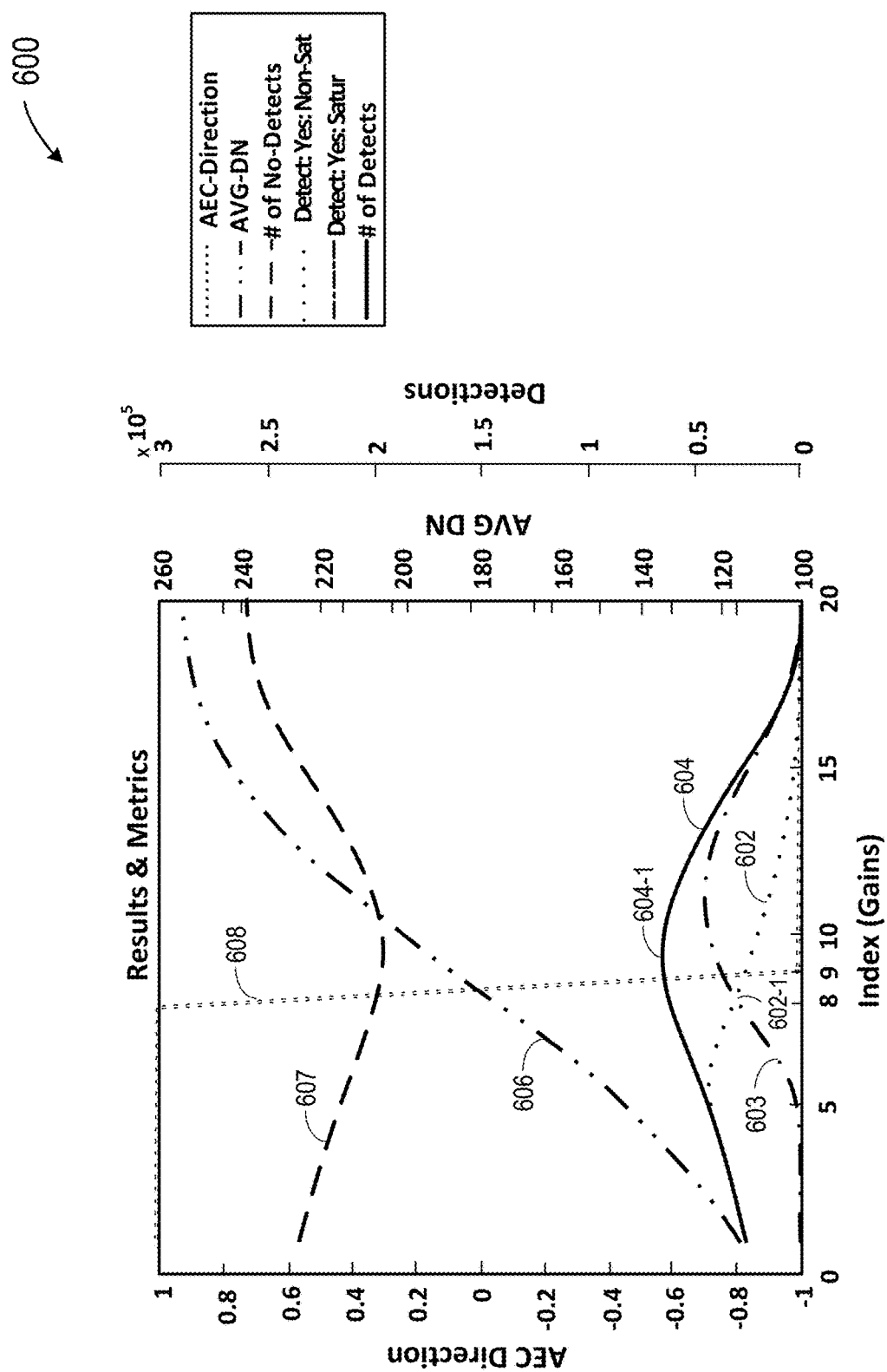
FIG. 6 is a diagram illustrating certain parameters and results data from an example of applying the gradient-based exposure and gain control techniques according to various embodiments of the present invention.

FIG. 6 is a diagram 600 illustrating certain parameters and results data from an example of applying the gradient-based exposure and gain control techniques according to various embodiments of the present invention. The images were taken with an edge threshold set at 64 units and a saturation threshold set at 230 units in an 8-bit system, where the outputs range from 0 to 255. In FIG. 6, the horizontal axis is an index of gains. The left vertical axis is AEC Direction. The AEC Direction value of "1" is indicative of "up the gain/exposure", and "0" is indicative of "lower the gain/exposure". The location where transition goes from 0 to 1, or 1 to 0, is where the settling point should be for the control system. The right vertical axis AVG DN, where "AVG DN" represents average digital number, which is the pixel value in numbers after it has been converted from an analog value to a digital value. It is essentially what is being referred to as "units" in this section. Curve 602 shows the number of non-saturated edge pixels as a function of the index of gains. Curve 603 shows the number of saturated edge pixels as a function of the index of gains. Curve 604 shows a sum of the number of non-saturated edge pixels and the number of saturated edge pixels as a function of the index of gains. In other words, curve 604 shows the number of total edge pixels detected as a function of the index of gains. Curve 606 shows AVG-DN. Curve 607 shows the number of pixels where no edges were detected. Curve 608 shows the AEC Directions, where the AEC Direction is "1" for the index of gains less than or equal to 8, and the AEC Direction is "0" for the index of gains greater than or equal to 9. It can be seen that, in this experiment, the maximum number of edge detected occurs at a point 604-1. A cross-over point between curve 602 and 603 is marked as 602-1, which occurs at an index of gains that resulted in an equal number of saturated and non-saturated edge pixels.

Figure 7:
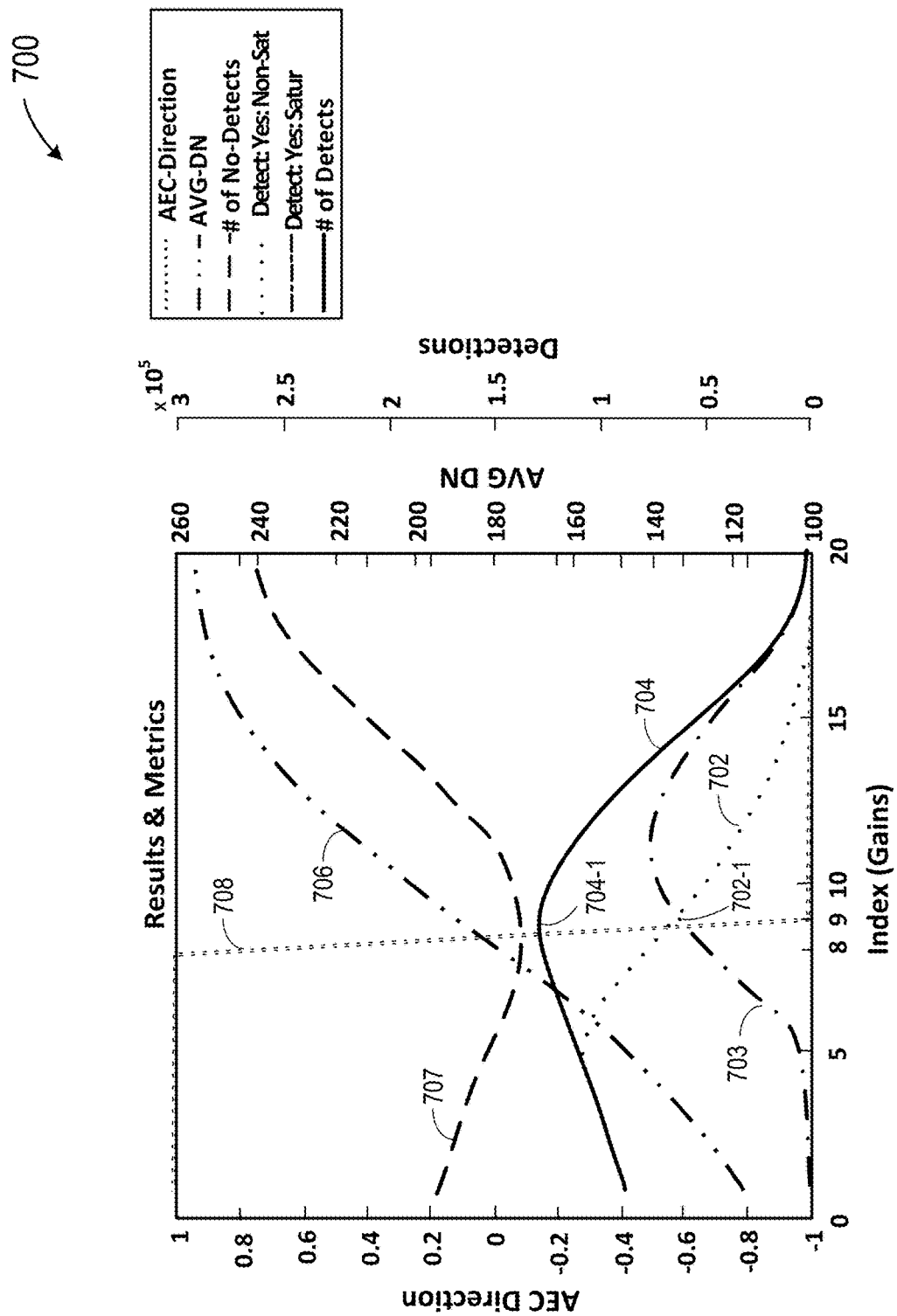
FIG. 7 is a diagram illustrating certain parameters and results data from another example of applying the gradient-based exposure and gain control techniques according to various embodiments of the present invention.

FIG. 7 is a diagram 700 illustrating certain parameters and results data from an example of applying the gradient-based exposure and gain control techniques according to various embodiments of the present invention. FIG. 7 is similar to FIG. 6, except that the images were taken with an edge threshold set at 32 units instead of 64 units used in FIG. 6, and a saturation threshold set at 230 units. In FIG. 7, the horizontal axis is an index of gains. The left vertical axis is AEC Direction, and the right vertical axis AVG DN. Curve 702 shows the number of non-saturated edge pixels as a function of the index of gains. Curve 703 shows the number of saturated edge pixels as a function of the index of gains. Curve 704 shows a sum of the number of non-saturated edge pixels and the number of saturated edge pixels as a function of the index of gains. In other words, curve 704 shows the number of total edge pixels detected as a function of the index of gains. Curve 706 shows AVG-DN. Curve 707 shows the number of pixels where no edges were detected. Curve 708 shows the AEC Directions, where the AVG Direction is "1" for the index of gains less than or equal to 8, and the AVG Direction is "0" for the index of gains greater than or equal to 9. It can be seen that, in this experiment, the maximum number of edge detected occur at a point 704-1. A cross-over point between curve 702 and 703 is marked as 702-1, which occurs at an index of gains that resulted in an equal number of saturated and non-saturated edge pixels.

Figure 8:
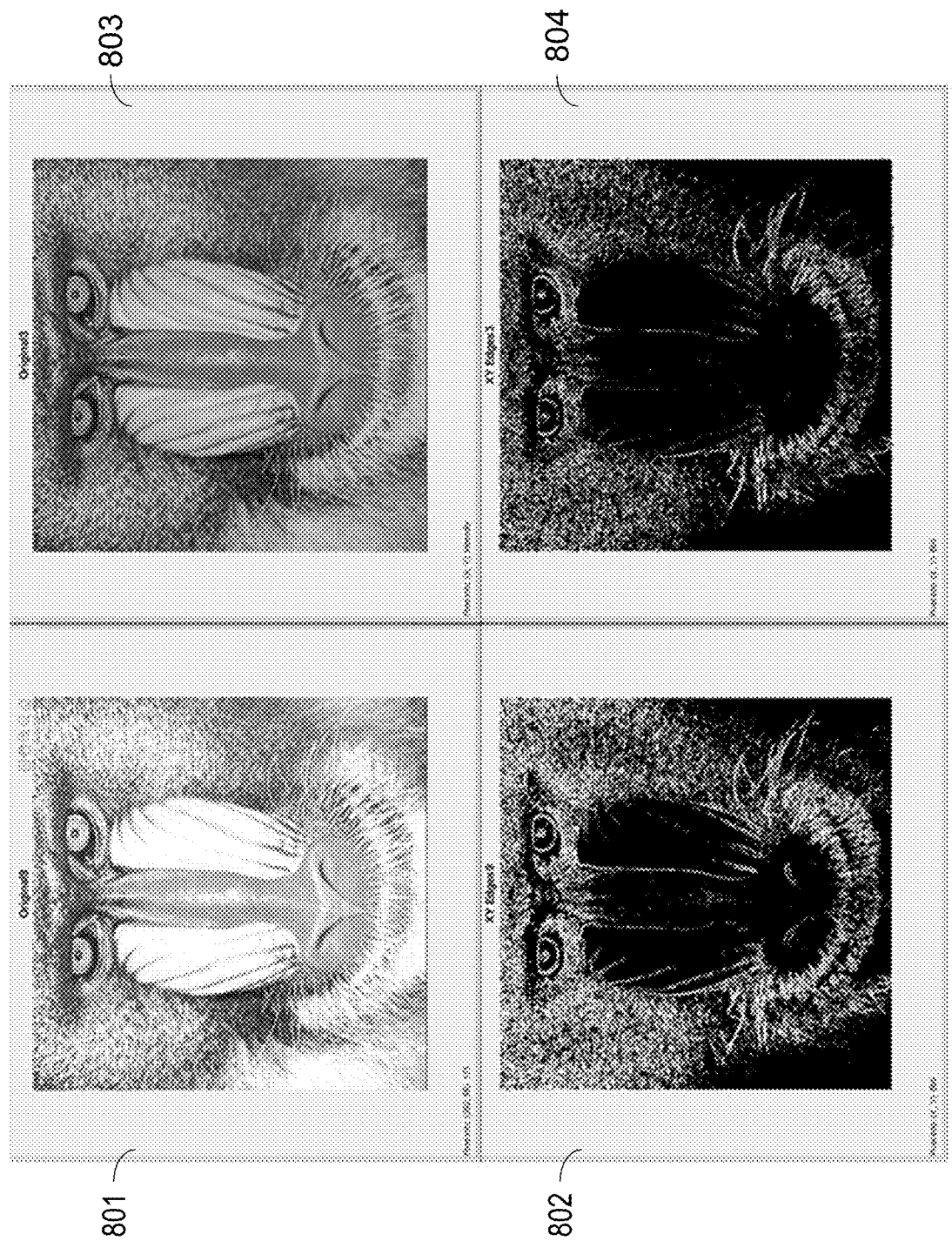
FIG. 8 shows examples of images and edge detection results comparing the gradient-based exposure and gain control techniques with conventional techniques.

FIG. 8 shows examples of images and edge detection results comparing the gradient-based exposure and gain control techniques with conventional techniques. In FIG. 8, 801 is an image taken with image settings (exposure and/or gain) determined from the gradient-based exposure and gain control techniques as described above. The edge detection threshold was set at 64 unit. In 802, the white points represent edge pixels detected in image 801 based on the gradient-based exposure and gain control techniques. For comparison, 803 is an image taken with conventional image settings (exposure and/or gain), with 128 DNs and an edge detection threshold of 64. In 804, the white points represent edge pixels detected based on 803 based on a conventional edge detection technique.

Figure 9:
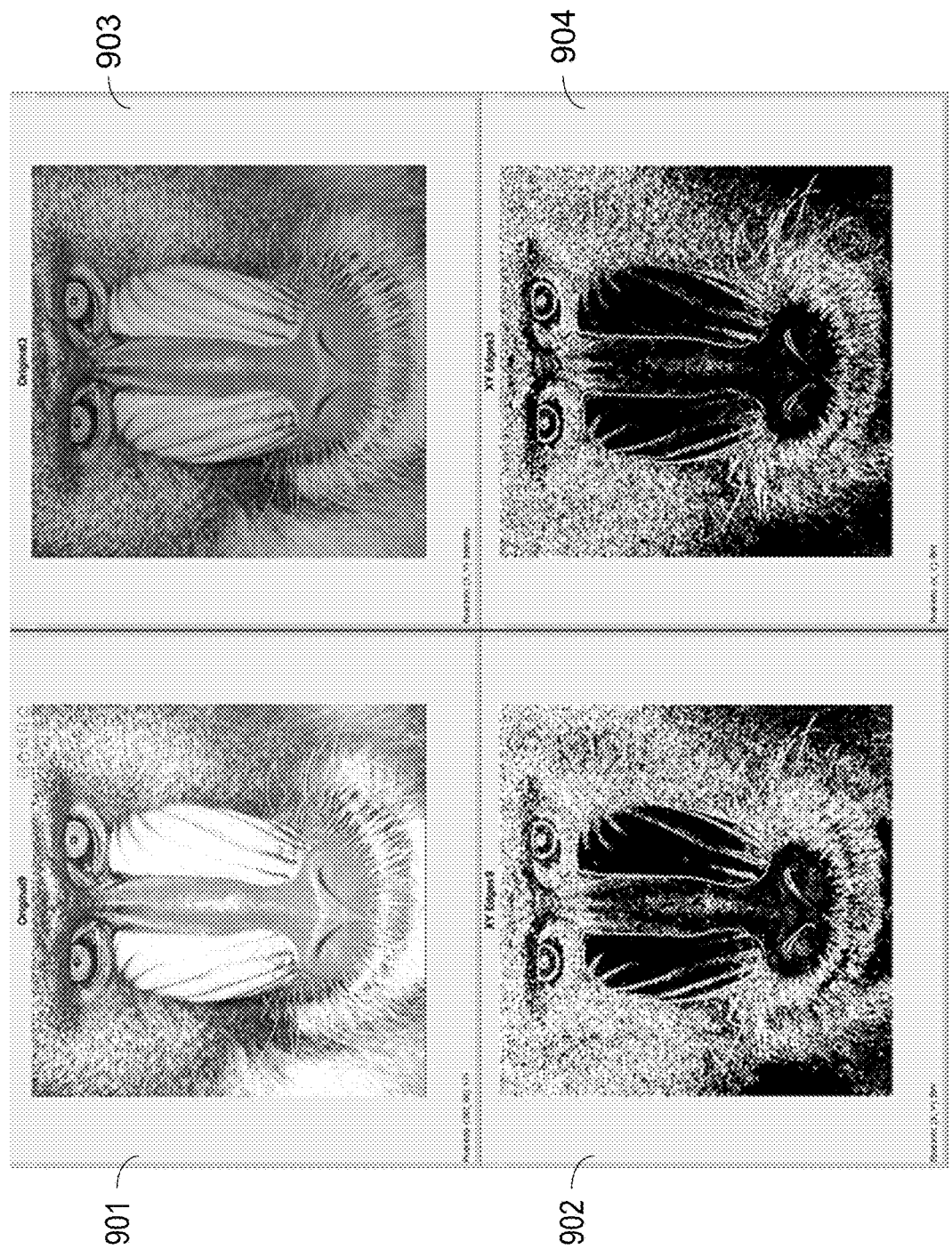
FIG. 9 shows examples of images and edge detection results comparing the gradient-based exposure and gain control techniques with conventional techniques.

FIG. 9 shows examples of images and edge detection results comparing the gradient-based exposure and gain control techniques with conventional techniques. In FIG. 9, 901 is an image taken with image settings (exposure and/or gain) determined from the gradient-based exposure and gain control techniques. The edge detection threshold was set at 32 unit. In 902, the white points represent edge pixels detected in image 901 based on the gradient-based exposure and gain control techniques. For comparison, 903 is an image taken with conventional image settings (exposure and/or gain), with 128 DNs and an edge detection threshold of 32. In 904, the white points represent edge pixels detected based on 903 using a conventional edge detection technique.

Figures 10A, 10B:
FIG. 10A and FIG. 10B compare a first image of a scene taken with a fixed exposure with a second image of the same scene using an exposure determined using the gradient-based exposure and gain control techniques described above.

FIG. 10A and FIG. 10B compare a first image of a scene taken with a fixed exposure with a second image of the same scene using an exposure determined using the gradient-based exposure and gain control techniques described above. Edge detection using FIG. 10A provides a total number of features of about 16,000. In contrast, edge detection using FIG. 10B provides a total number of features of about 22,000. It can be seen, from FIGS. 8, 9, and 10A-10B, that the gradient-based exposure and gain control techniques described above is effective in detecting more edge features.

Figure 11:
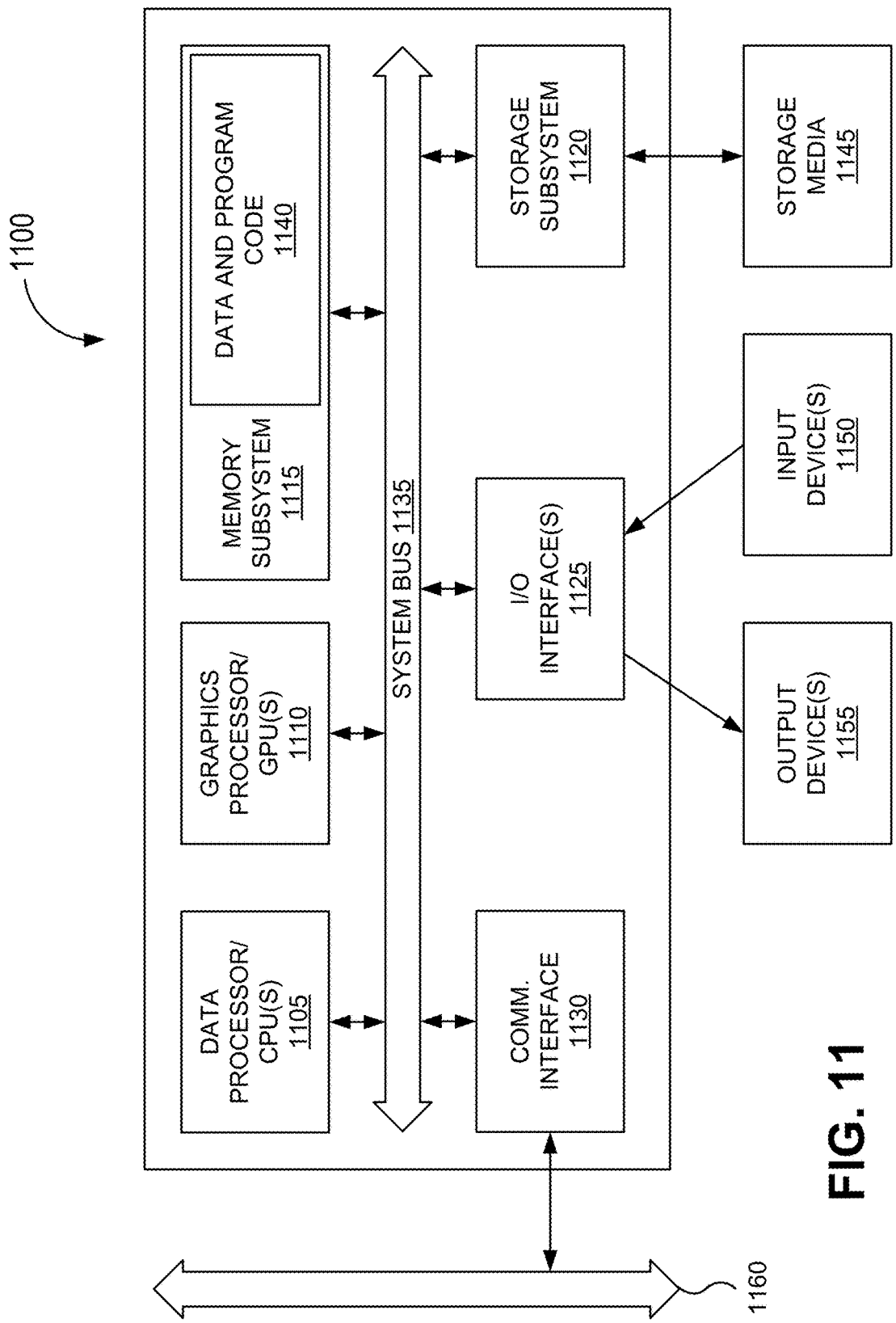
FIG. 11 illustrates an example of a block diagram for a computer system that can be used to implement various aspects in accordance of various embodiments of the present invention.

FIG. 11 is a block diagram of a computer system or information processing device that may incorporate an embodiment, be incorporated into an embodiment, or be used to practice any of the innovations, embodiments, and/or examples found within this disclosure.

FIG. 11 is a block diagram of computer system 1100. FIG. 11 is merely illustrative. In some embodiments, a computer system includes a single computer apparatus, where the subsystems can be the components of the computer apparatus. In other embodiments, a computer system can include multiple computer apparatuses, each being a subsystem, with internal components. Computer system 1100 and any of its components or subsystems can include hardware and/or software elements configured for performing methods described herein.

Computer system 1100 may include familiar computer components, such as one or more data processors or central processing units (CPUs) 1105, one or more graphics processors or graphical processing units (GPUs) 1110, memory subsystem 1115, storage subsystem 1120, one or more input/output (I/O) interfaces 1125, communications interface 1130, or the like. Computer system 1100 can include system bus 1135 interconnecting the above components and providing functionality, such connectivity as inter-device communication.

The one or more data processors or central processing units (CPUs) 1105 can execute logic or program code or for providing application-specific functionality. Some examples of CPU(s) 1105 can include one or more microprocessors (e.g., single core and multi-core) or micro-controllers, one or more field-gate programmable arrays (FPGAs), and application-specific integrated circuits (ASICs). As user herein, a processor includes a multi-core processor on a same integrated chip, or multiple processing units on a single circuit board or networked.

The one or more graphics processor or graphical processing units (GPUs) 1110 can execute logic or program code associated with graphics or for providing graphics-specific functionality. GPUs 1110 may include any conventional graphics processing unit, such as those provided by conventional video cards. In various embodiments, GPUs 1110 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 1110 may include any number of registers, logic units, arithmetic units, caches, memory interfaces, or the like.

Memory subsystem 1115 can store information, e.g., using machine-readable articles, information storage devices, or computer-readable storage media. Some examples can include random access memories (RAM), read-only-memories (ROMS), volatile memories, non-volatile memories, and other semiconductor memories. Memory subsystem 1115 can include data and program code 1140.

Storage subsystem 1120 can also store information using machine-readable articles, information storage devices, or computer-readable storage media. Storage subsystem 1120 may store information using storage media 1145. Some examples of storage media 1145 used by storage subsystem 1120 can include floppy disks, hard disks, optical storage media such as CD-ROMS, DVDs and bar codes, removable storage devices, networked storage devices, or the like. In some embodiments, all or part of data and program code 1140 may be stored using storage subsystem 1120.

The one or more input/output (I/O) interfaces 1125 can perform I/O operations. One or more input devices 1150 and/or one or more output devices 1155 may be communicatively coupled to the one or more I/O interfaces 1125. The one or more input devices 1150 can receive information from one or more sources for computer system 1100. Some examples of the one or more input devices 1150 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 1150 may allow a user of computer system 1100 to interact with one or more non-graphical or graphical user interfaces to enter a comment, select objects, icons, text, user interface widgets, or other user interface elements that appear on a monitor/display device via a command, a click of a button, or the like.

The one or more output devices 1155 can output information to one or more destinations for computer system 1100. Some examples of the one or more output devices 1155 can include a printer, a fax, a feedback device for a mouse or joystick, external storage systems, a monitor or other display device, a communications interface appropriately configured as a transceiver, or the like. The one or more output devices 1155 may allow a user of computer system 1100 to view objects, icons, text, user interface widgets, or other user interface elements. A display device or monitor may be used with computer system 1100 and can include hardware and/or software elements configured for displaying information.

Communications interface 1130 can perform communications operations, including sending and receiving data. Some examples of communications interface 1130 may include a network communications interface (e.g. Ethernet, Wi-Fi, etc.). For example, communications interface 1130 may be coupled to communications network/external bus 1160, such as a computer network, a USB hub, or the like. A computer system can include a plurality of the same components or subsystems, e.g., connected together by communications interface 1130 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Computer system 1100 may also include one or more applications (e.g., software components or functions) to be executed by a processor to execute, perform, or otherwise implement techniques disclosed herein. These applications may be embodied as data and program code 1140. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 1115 and/or storage subsystem 1120.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

While various embodiments of the invention have been described above, it should be understood that they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described. They instead can be applied alone or in some combination, to one or more of the other embodiments of the disclosure, whether or not such embodiments are described, and whether or not such features are presented as being a part of a described embodiment. Thus the breadth and scope of the present disclosure should not be limited by any of the above-described exemplary embodiments.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to", or other like phrases in some instances shall not be read to mean that the narrower case is intended or required in instances where such broadening phrases may be absent.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method, comprising:
    capturing an image using a content capture device with an initial image setting, wherein the image includes a plurality of pixels, each pixel having a respective image intensity;
    determining a gradient vector for each of the plurality of pixels, wherein the gradient vector for a given pixel includes differences in image intensity between the given pixel and one or more neighboring pixels of the given pixel;
    identifying a plurality of edge pixels, wherein the gradient vector for each of the plurality of edge pixels exceeds a first threshold value;
    for each edge pixel of the plurality of edge pixels:
        determining if an image intensity of one or more neighboring pixels of the edge pixel exceeds a second threshold value;
        in response to determining that the image intensity of at least one of the one or more neighboring pixels exceeds the second threshold value, classifying the edge pixel as a saturated edge pixel; and
        otherwise, classifying the edge pixel as a non-saturated edge pixel;
    determining a total number of saturated edge pixels and a total number of non-saturated edge pixels;
    forming an updated image setting based on the total number of saturated edge pixels and the total number of non-saturated edge pixels; and
    capturing an updated image using the content capture device with the updated image setting.

2. The method of claim 1, wherein the image setting comprises one or more of an exposure and a gain of an image sensor in the content capture device.

3. The method of claim 1, wherein the updated image setting comprises a ratio of a long exposure time to a short exposure time for a two-frame High-Dynamic Range (HDR) configuration of an image sensor in the content capture device.

4. The method of claim 1, further comprising repeating capturing an updated image and updating the image setting until a figure of merit is reached;
    wherein, in an $n^{th}$ iteration, n being an integer, the total number of saturated edge pixels is designated as "$s_n$," and the total number of non-saturated edge pixels is designated as "$m_n$".

5. The method of claim 4, wherein forming an updated image setting comprises:
    determining an error value ("En") based on the total number of saturated edge pixels ("$s_n$") and the total number of non-saturated edge pixels ("$m_n$"); and
    using a proportional-integral-derivative (PID) controller to determine an adjustment value to the image setting.

6. The method of claim 5, wherein the error value is defined as:

$$E_n = \frac{m_n - s_n}{m_n + s_n}$$

wherein:
    $E_n$ is the error value for the $n^{th}$ image obtained by the content capture device;
    $m_n$ is the quantity of edges detected in the $n^{th}$ image that are classified as not saturated; and
    $s_n$ is the quantity of edges detected in the $n^{th}$ image that are classified as saturated.

7. The method of claim 6, wherein the adjustment value An is defined as:

$$A_n = K_p E_n + K_i \sum_{j=n_0}^{n} E_j + K_d(E_n - E_{n-1})$$

wherein:
    $A_n$ is the adjustment to be made by the content capture device based on the $n^{th}$ image;
    $K_p$ is a proportional gain tuning parameter;
    $K_i$ is an integral gain tuning parameter;
    $K_d$ is a derivative gain tuning parameter; and
    w is a window size (predefined constant value).

8. The method of claim 4, wherein forming an updated image setting comprises:
    comparing the total number of saturated edge pixels ("$s_n$") and the total number of non-saturated edge pixels ("$m_n$");
    increasing the image setting in response to determining that $m_n > s_n$;
    decreasing the image setting in response to determining that $m_n < s_n$; and making no adjustment to the image setting in response to determining that $m_n = s_n$.

9. The method of claim 4, wherein the figure of merit is reached when the total number of saturated edge pixels ("$s_n$") is equal to the total number of non-saturated edge pixels ("$m_n$").

10. The method of claim 4, wherein the figure of merit is reached when a difference between the total number of saturated edge pixels ("$s_n$") and the total number of non-saturated edge pixels ("$m_n$") is less than a preset value.

11. A content capture device, comprising:
an image sensor for capturing an image with an image setting, wherein the image includes a plurality of pixel groups, each pixel group including one or more pixels, each pixel group having a respective image intensity;
an edge detection and classification module coupled to the image sensor, and configured to:
identify a plurality of edge pixel groups; and
classify the plurality of edge pixel groups into two subsets:
a first subset of saturated edge pixel groups including edge pixel groups that have at least one neighboring pixel group with an image intensity exceeding a saturated intensity value; and
a second subset of non-saturated edge pixel groups including edge pixel groups that have no neighboring pixel groups with an image intensity exceeding a saturated intensity value; and
an image sensor control module coupled to the edge detection and classification module and the image sensor to form a feedback loop, the image sensor control module configured to determine an adjustment value to the image setting based on a total number of saturated edge pixel groups and a total number of non-saturated edge pixel groups;
wherein the content capture device is configured to capture an updated image using the image sensor with an updated image setting based on the adjustment value.

12. The device of claim 11, wherein the content capture device is configured to repeat capturing an updated image and updating the image setting until a figure of merit is reached;
wherein, in an $n^{th}$ iteration, n being an integer, the total number of saturated edge pixel groups is designated as "$s_n$" and the total number of non-saturated edge pixel groups designated as "$m_n$".

13. The device of claim 12, wherein the image sensor control module is configured to:
determine an error value ("En") based on the total number of saturated edge pixel groups ("$s_n$") and the total number of non-saturated edge pixel groups ("$m_n$"); and
use a proportional-integral-derivative (PID) controller to determine an adjustment value to the image setting.

14. The device of claim 13, wherein the error value is defined as:

$$E_n = \frac{m_n - s_n}{m_n + s_n}$$

wherein:
$E_n$ is the error value for the $n^{th}$ image obtained by the content capture device;
$m_n$ is the quantity of edges detected in the $n^{th}$ image that are classified as not saturated; and
$s_n$ is the quantity of edges detected in the $n^{th}$ image that are classified as saturated.

15. The device of claim 14, the adjustment value An is defined as:

$$A_n = K_p E_n + K_i \sum_{j=n_0}^{n} E_j + K_d(E_n - E_{n-1})$$

$$n_0 = \begin{cases} 1, & n \leq w \\ n - w, & n > w \end{cases}$$

wherein:
$A_n$ is the adjustment to be made by the content capture device based on the $n^{th}$ image;
$K_p$ is a proportional gain tuning parameter;
$K_i$ is an integral gain tuning parameter;
$K_d$ is a derivative gain tuning parameter; and
w is a window size (predefined constant value).

16. The device of claim 12, wherein the image sensor control module is configured to:
compare the total number of saturated edge pixels ("$s_n$") and the total number of non-saturated edge pixels ("$m_n$");
increase the image setting in response to determining that $m_n > s_n$;
decrease the image setting in response to determining that $m_n < s_n$; and
make no adjustment to the image setting in response to determining that $m_n = s_n$.

17. A method, comprising:
capturing an image with an image setting, wherein the image includes a plurality of pixel groups, each pixel group including one or more pixels, each pixel group having a respective image intensity;
identifying a plurality of edge pixel groups;
classifying the plurality of edge pixel groups into two subsets:
a first subset including saturated edge pixel groups, in which each edge pixel group has at least one neighboring pixel group with an image intensity exceeding a saturated intensity value; and
a second subset including non-saturated edge pixel groups in which each edge pixel group has no neighboring pixel groups with an image intensity exceeding a saturated intensity value;
determining an adjustment value to the image setting based on a total number of saturated edge pixel groups and a total number of non-saturated edge pixel groups; and
capturing an updated image with an updated image setting based on the adjustment value.

18. The method of claim 17, wherein further comprising repeating capturing an updated image and updating the image setting until a figure of merit is reached.

19. The method of claim 18, wherein determining an adjustment value to the image setting comprises:
determining an error value based on the total number of saturated edge pixel groups and the total number of non-saturated edge pixel groups; and
using the error value in a proportional-integral-derivative (PID) controller to determine the adjustment value to the image setting.

20. The method of claim 18, wherein determining an adjustment value to the image setting comprises:

comparing the total number of saturated edge pixel groups ("$s_n$") and the total number of non-saturated edge pixel groups ("$m_n$");
selecting a positive adjustment value to the image setting in response to determining that $m_n > s_n$;
selecting a negative adjustment value to the image setting in response to determining that $m_n < s_n$; and
making no adjustment to the image setting in response to determining that $m_n = s_n$.

* * * * *

UNITED STATES PATENT AND TRADEMARK OFFICE
CERTIFICATE OF CORRECTION

PATENT NO. : 11,503,204 B2
APPLICATION NO. : 17/127415
DATED : November 15, 2022
INVENTOR(S) : Huang et al.

It is certified that error appears in the above-identified patent and that said Letters Patent is hereby corrected as shown below:

In the Claims

In Column 21, Line 48, Claim 12: insert --is-- before "designated."

In Column 22, Line 3, Claim 15: insert --wherein-- after the "," and before "the adjustment."

Signed and Sealed this
Twenty-eighth Day of February, 2023

Katherine Kelly Vidal
*Director of the United States Patent and Trademark Office*